Sept. 1, 1953 R. W. CLAUSS 2,650,538
PINTICKET MANUFACTURING AND ATTACHING MACHINE
Original Filed April 30, 1947 4 Sheets-Sheet 1

INVENTOR
Robert W. Clauss
BY C. P. Goepel
his ATTORNEY

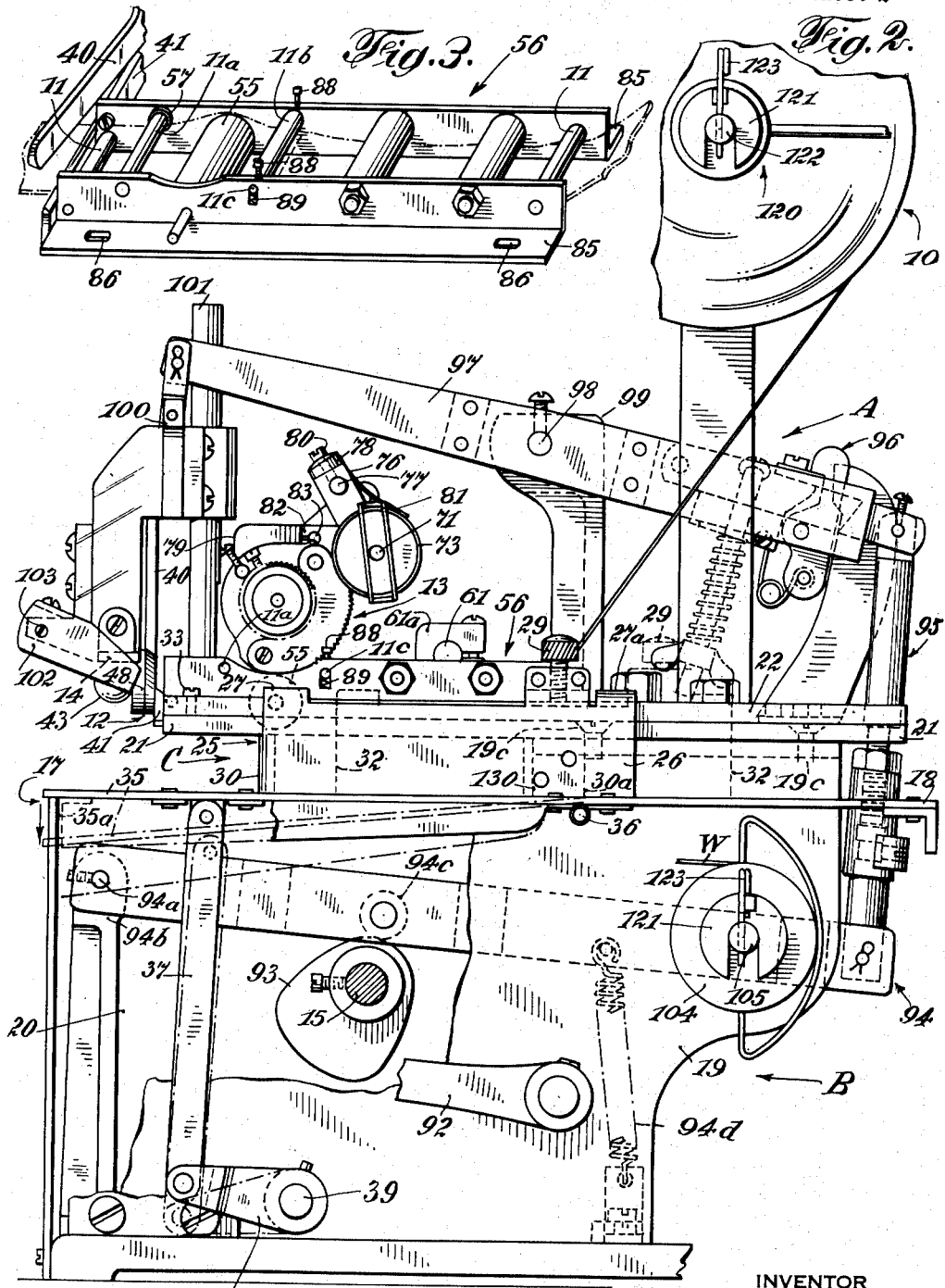

INVENTOR
Robert W. Clauss
BY C. P. Goepel
his ATTORNEY

Sept. 1, 1953        R. W. CLAUSS        2,650,538
PINTICKET MANUFACTURING AND ATTACHING MACHINE
Original Filed April 30, 1947        4 Sheets-Sheet 4
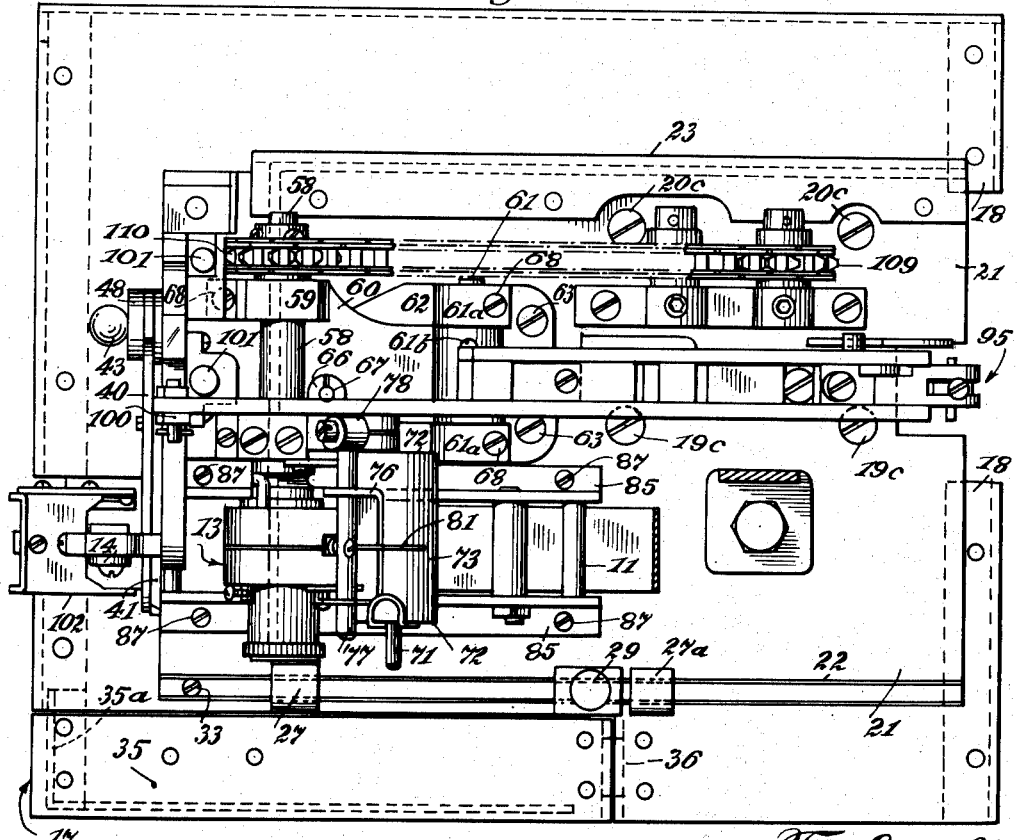
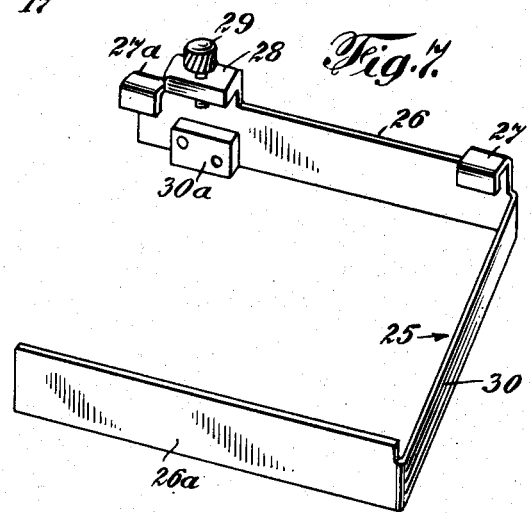
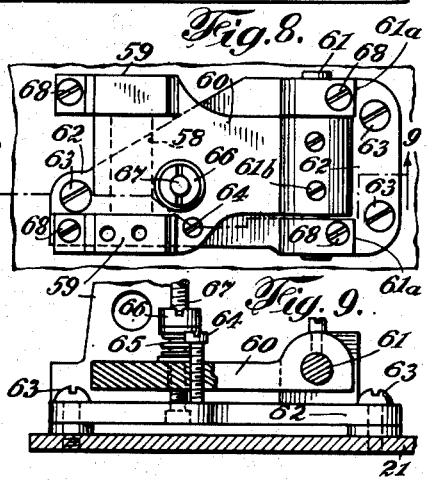
INVENTOR
*Robert W. Clauss*
BY *C. P. Goepel*
his ATTORNEY Patented Sept. 1, 1953

2,650,538

UNITED STATES PATENT OFFICE 2,650,538

PINTICKET MANUFACTURING AND ATTACHING MACHINE

Robert W. Clauss, New York, N. Y.

Original application April 30, 1947, Serial No. 744,921. Divided and this application October 25, 1948, Serial No. 56,329

5 Claims. (Cl. 101—227)

1

This invention relates to pinticket manufacturing and attaching machines and is an improvement over the structure shown and described in U. S. Letters Patent No. 1,503,745 granted on August 5, 1924, to Max O. Clauss for Label Attaching Machines.

The improvement consists in a mouth formed by a base portion supporting certain of the operating parts and by a table, forming a platform upon which the material to be tagged or labeled, can be placed. The mouth is formed by a base plate which supports the inking, feeding, printing, registering of paper and the cutting device, which base plate is arranged to have a substantial part of it spaced from a table upon which the garments or materials are placed to have the labels or tickets attached thereto, said space being sufficient for the unimpeded movement of the garment or material on the table. As part of the operative mechanism extends from the lower part of the machine to the upper part thereof, a guide member is disposed within the space, and this guide member is suitably fastened at the desired position depending on the size or character of the garment or material. Thereby, this guide member forms a protector at the rear of the mouth between the upper base portion and the table below. Part of this table is used as a means to start the operation of the machine, and is so designed that whatever the mouth adjustment is, the starter is at hand.

The cutting knives have a shear action. This is enabled by providing the movable knives with a stem, which stem is out of center with the knife action, whereby the movable knife has a shearing action with the stationary knife. Said stem is held in place by a plate having a slot the walls of which engage a cut out of the stem. This stem acts as a pivot for the movable knife, said stem having a ball at its other end, and a washer with a concave depression of the same curvature as the ball, said plate having means fastening it in spaced relation to the machine frame.

Upon the upper part of the mouth, the inking, feeding, printing, registering of the paper, and cutting is performed, keeping the mouth free from all of these operations. A paper guide unit for guiding the paper properly to the printing is also provided.

The printing head has its shaft suspended against an adjustable plate on the base plate, in a manner to allow the shaft and printing head to move up or down to give a yielding effect to the printing head. The printing and feeding head is mounted movable, with a stop and tension spring for the proper paper printing distance and pressure. By the means of increasing or decreasing the curvature of the paper, at the place where it is to be printed, or the sliding back and forth of the paper guide unit, or both, the registering of the ticket is performed.

As the cutting of each ticket must be in registration with printed matter thereon, it is essential that the printing must be so placed on the paper, that by the time it is subjected to cutting, it is guided so that the cutting is properly done. For this purpose, a carriage for the printing roller is provided which carriage is movable, until adjusted in proper position. Also, a roller on this carriage is disposed adjacent the printing roller to give the desired curvature to the paper, which varies with each kind of paper, and which curvature determines the printing surface. The registering of the paper is important for the proper shape of the ticket, and is essential due to the various types of paper that are used.

The inking roller has a double adjustment.

The invention will be more fully described hereinafter, embodiments thereof shown in the drawings, and the invention will be finally pointed out in the claims.

In the accompanying drawings,

Fig. 2 is a side view;

Fig. 3 is a perspective view of the printing roller unit or carriage, showing the paper adjustment;

Fig. 6 is a plan view of Fig. 1;

Fig. 7 is a perspective view of the guide for the mouth;

Fig. 8 is a plan view of the printing head shaft adjustment; and

Fig. 9 is a section taken on line 9—9 of Fig. 8.

Similar characters of reference indicate corresponding parts throughout the various views.

Figure 1:
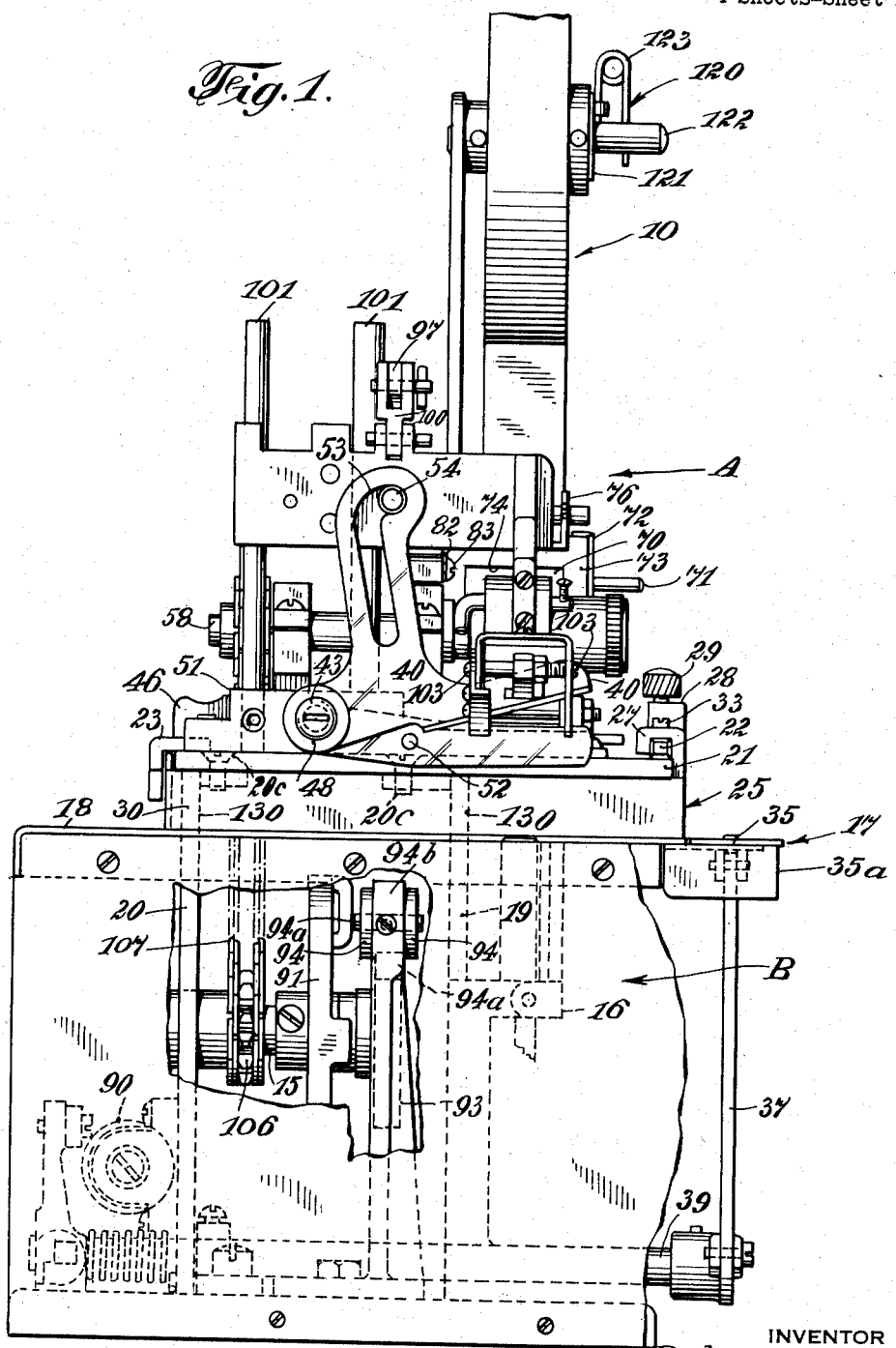
Fig. 1 is a front view.

Referring to the drawings, the machine may be considered as divided into two parts, the upper part A and the lower part B. A strip paper 10, a scissor 12 for cutting off the paper, a printing mechanism 13, for printing and feeding the paper, and the stapling die member 14, together with their operative parts, are arranged in the upper part A. In the lower part B a horizontal table or platform 18 extends the width and length of the machine, permitting passage at the rear thereof of certain operative parts extending from the lower part B to the upper part A. A central vertical wall 19 extends from the bottom of the machine to the table 18, and upwardly beyond where the mouth ends to support the base plate 21, and a second vertical wall 20 extends from the bottom of the machine to the table 18, and upwardly beyond where the mouth ends to support the base plate 21. Also, on these walls 19 and 20 operative parts below the base plate 21 are supported.

The first improvement (Fig. 1) is a horizontal base portion 21 for the operative parts comprising the upper part A, which is spaced from the table 18, which is located in the lower part B, a distance about equal to that necessary to allow room for the material to be stapled or tagged.

The second improvement (Fig. 7) is an adjustable mouth guide 25 of general U shape which has on the upper edge of one of its legs 26, a hook portion 27 at its front end and a hook portion 27a at its rear end, and also an inwardly extending flange 28 with an adjustable screw 29. The base portion has at one longitudinal side thereof an upwardly extending flange 22 and has at its other longitudinal side a downwardly extending flange 23. A block 30a is secured to the leg 26 and is spaced from the screw 29, to allow for the passage of upwardly extending flange 22, whereby a clamping effect is obtained. The hook portions 27 and 27a each extend over the upwardly extending flange 22, and the screw 29 serves to press against the flange 22 for locking the guide 25 in a fixed position. The other leg 26a extends under the flange 23. The front portion 30 has a height substantially equal to the space between the table 18 and the base portion 21, that is, about the amount of space needed for the entry and free passage of the material to which the ticket is to be applied. The lower surface of the base portion 21, the upper surface of the table 18 and the front surface of the front wall 30 of the guide 25, form a mouth for the passage of material at the rear of the staple attaching mechanism generally indicated by 16 and 14. The guide 25 may be placed in any desired position and then secured in position. In Fig. 2, the dotted lines 32 show another position of the guide 25 than that shown in full lines. The extent of movement of the guide 25 is determined by abutment 33, in the form of a screw, at the front and by the walls 19 and 20, which are extending upwardly beyond the table 18 to support the base plate 21.

The third improvement (Fig. 1) is the arrangement of the operating plate 17, which is so designed that it is in a convenient position in respect to the mouth, whatever its adjustment may be. This plate releases the clutch mechanism which in turn starts the machine. At the right end of the table 18, and normally at the level thereof, is a plate 35 hinged at 36 to the table 18, and to the underside of the plate 35, a lever 37 is pivoted which lever is connected with a crank arm 38 pivoted to the starting shaft 39. The plate 35 has a vertical member 35a which extends below the table 18. By arranging the material in proper position all that is necessary is to press the plate 35 downwardly momentarily and then release. The machine sets in operation and it continues to operate until the ticket has been made and fastened.

Figure 5:
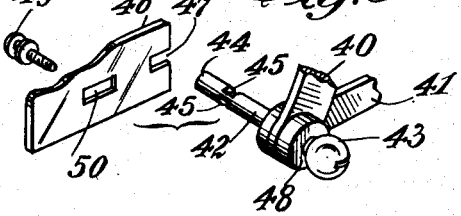
Fig. 5 is a perspective view of the knife or scissor holder, shown in spaced position.

The fourth improvement is found in the scissor action. (Fig. 5.)

The blades 40 and 41 are pivoted to a central stem 42, having an end ball 43, and having near its other end 44, diametrically opposite cutouts 45. A plate 46 has a slot 47, the walls of which engage the cutouts 45. A washer 48 with a concave depression is provided, into which depression a ball 43 seats. The plate 46 acts as a tension member and a lock for the stem 42. The plate 46 acts also as a spring for the purpose of keeping the upper or moving knife 40 together with tension against the stationary knife 41. A screw 49 fits into the slot 50 to support the plate 46 to the supporting block 51. The knife 41 is secured to the upper base portion by a screw 52. The knife 40 has a cam plate 53 which is operated by the roller 54. The stem 42 is out of center with the knife action causing the knife 40 to be moved in a downward and inward motion, while it is operating against the stationary knife 41. This shear action facilitates the cutting of the paper. The tension plate 46, the concave washer 48, and the out of center stem 42, cooperate together to give the movable knife 40, the shear action described.

The fifth improvement is the paper guide unit (see Figure 3). The lower printing roller 55 is rotatably supported by the frame 56 which supports the paper guide rollers 11. The guide roller 11a adjacent the lower printing roller 55 has collars 57 at its ends to enable the strip of paper to ride thereon, so that the printed portion of the paper, on which the ink is still wet will not contact with the roller 11a.

The sixth improvement is the printing head adjustment. (Fig. 9.) The printed head 13 is supported on a shaft 58 which rotates in trunnions 59. These trunnions 59 form part of a plate 60 which is pivoted at a shaft 61. These trunnions also provide additional space for easy adjustments for larger or smaller printing heads, for longer and shorter tickets. Below the plate 60 is a second plate 62 which is fixed by screws 63 to the base portion 21. A stop screw 64 is fastened to the plate 60 and engages the plate 62. A tension spring 65 is disposed between the plate 60 and a nut 66 of a screw 67, which screw 67 is fastened in plate 62. The screw 67 is permanently secured to the plate 62. By moving the nut 66 downward the tension of the spring is increased. This arrangement allows the plate 60 with its trunnions and printing head to move up and down, to give a yielding effect to the action of the printing head. The shaft 61 is supported in bearing 61a on the plate 62. Screws 61b fasten the plate 60 to the shaft 61. Clamping screws 68 serve to take up the wear of the bearings.

Figure 4:
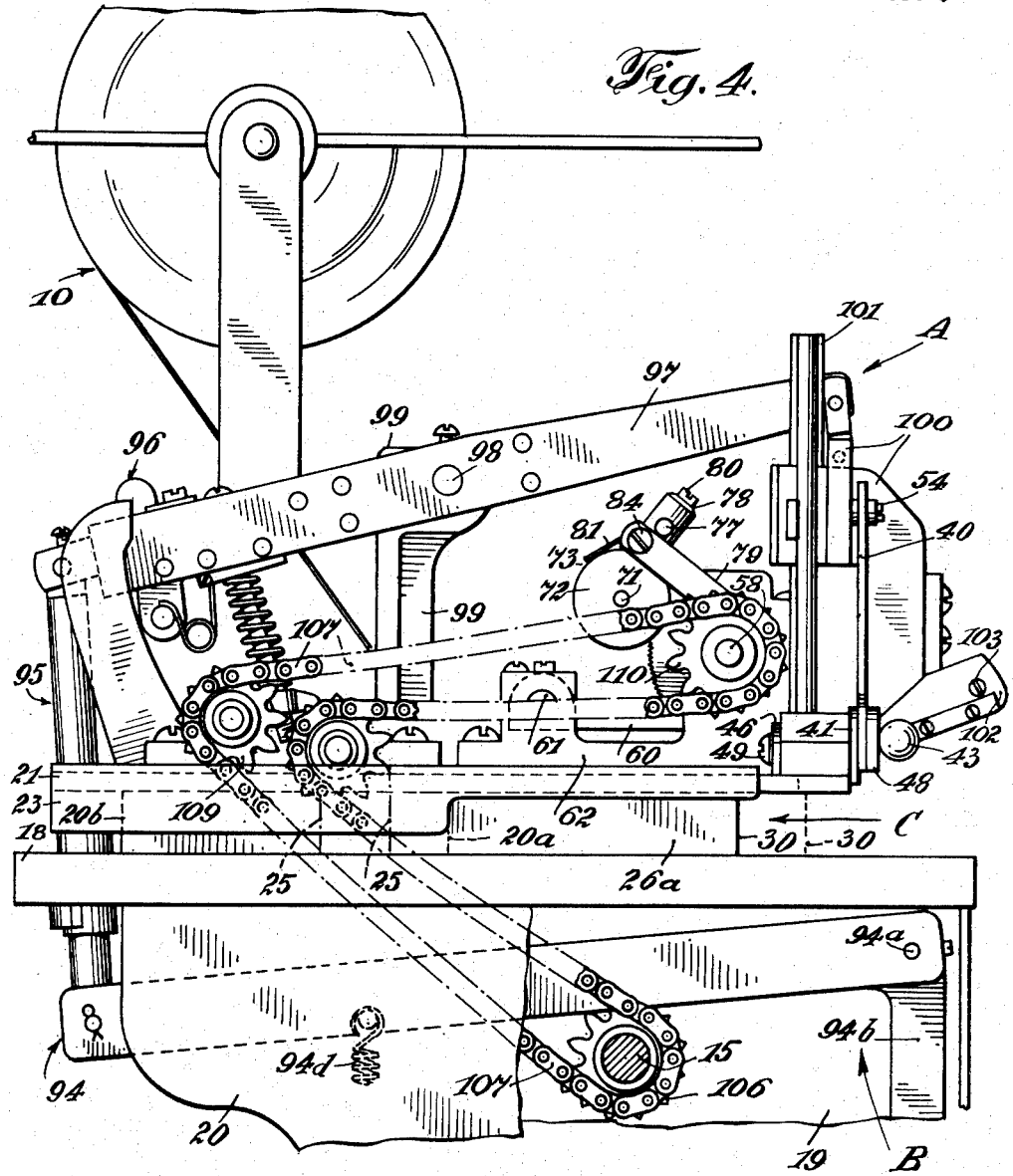
Fig. 4 is a side view, opposite to that shown in Fig. 2.

The seventh improvement is the enclosed inking roller with its double adjustments. The roller 70 (Fig. 1) is on a shaft 71 supported by the closed ends 72 of the cylindrical casing 73. This casing has a rectangular window or opening 74 to permit the printing head 13 to contact with the inking roller 70, and the shaft freely rotates in the ends 72 of the casing 73. (See also Figs. 2 and 4.) The casing 73 has extensions 76, with openings therein, through which a supporting shaft 77 passes. One end of this shaft 77 is fixed to an extension 78 on the printing head support 79. The supported end of this shaft 77 is adjustable in its position in two directions. One direction, by means of a screw 80 which enables the shaft to be rotated when the screw 80 is loose. A tension spring 81 is fixed on the shaft 77 and is adapted to press against the casing 73. This spring 81 then presses the casing 73 against an adjustable stopping mechanism 82 on the printing head support 79. The stopping mechanism 82 is held in place and adjusted by screw 83. Thereby, the inking roller 73 is held in the proper position for the printing head to receive the necessary inking. The adjustment of the shaft 77 in the other direction is to align the inking roller to the printing head. This is done by screw clamp 84, which holds the shaft 77 in the proper adjusted position to obtain the best alignment with the type face.

The eighth improvement is the registering device for the cutting of the printed strip. (Fig. 3.) As known, paper has different textures, and one roll of paper may depart somewhat from another roll. This requires registering the paper to a position so that the cutting is always properly aligned with the printed matter on the ticket. For this purpose the printing roller unit 56 (Fig. 3) is provided with horizontal longitudinal flanges 85 with slots 86. The flanges 85 rest upon the upper surface of the plate 21. Screws 87 pass through these slots 86, and hold the unit 56 in fixed position. The adjustment of this position enables the printing roller 55 to be placed in proper position to the printing type of the printing head 13, in respect to the particular thickness or texture of the particular paper being used, and for the proper amount of feeding of the paper.

Also another adjustment resides in the manipulation of the roller 11b. The shaft 11c of this roller is adjustable in vertical position by means of screws 88, the shaft ends being in slots 89. The adjustment of the roller 11b then permits the changing of the curvature of the paper as it is presented to the printing head, the increasing of the curvature of the paper lessens the amount of paper that will be fed, and the decreasing of the curvature of the paper increases the amount of paper that will be fed. By these adjustments, or either of them, the printing on the paper is such as to register properly with the cutting off of each individual ticket, so that on the cut off ticket the printed matter is properly spaced on the ticket face in respect to the cut off ends.

A tension and a retention device 120 is used to retain the paper or wire on the roller and at the same time gives it tension. This consists of a slotted plate 121, which seats around the paper roller shaft 122, which has a hole for the entrance of a coiled spring 123. A like device is used for wire roller.

An essential feature of the invention underlying the improvements, is the printing of an unprinted strip of paper 10, at the front of the machine, where the ticket is entirely manufactured, in that, it is printed, registered and cut off. This manufacture of the ticket is immediately above the mouth entrance. The knives 40 and 41 of scissors are disposed entirely above the mouth entrance and do not act as a barrier to the entry of the material or garments. The printing roller is also disposed entirely above the mouth. All operative parts between the upper and lower parts A and B, are disposed at the rear of the mouth, thereby leaving the mouth open for the material or garments. The mouth opening is regulated by the adjustment of the guide 25.

The operative parts shown in the drawings and not above specifically described are substantially like those in U. S. Letters Patent No. 1,503,745, of August 5, 1924, granted to Max O. Clauss, with such differences as will appear, and are now described for completeness sake.

The main shaft 15 is connected with a clutch mechanism for the starting and automatic stopping of the machine after a ticket has been made. This clutch mechanism 90 is described in detail in U. S. Letters Patent No. 1,584,846 of May 18, 1926, to Max O. Clauss. The main shaft 15 makes one revolution per ticket. A cam 91 drives the staple making arm 92 for the operation of the staple making mechanism 16. Cam 93 operates the lever 94 (Fig. 2) pivoted at 94a to a standard 94b, by means of a roller 94c. The roller 94c is held against cam 93 by spring 94d attached to 94. The lever 94 moves the member 95 through the locking mechanism 96, and lever 95 moves the lever 97 pivoted at 98 to an upright 99. The end of the lever 97, drives a plate 100 guided by rods 101 in a downward motion to move the knife 40 downwardly against the knife 41. This downward motion also moves the ticket carriage 102, which is pivoted at 103 to the plate 100. On plate 100 a stapling anvil or die 14 is supported, which coacts with the stapling mechanism 16 of part B. The wire W is fed from a spool 104 on a shaft 105 supported on the frame member 19.

On the main shaft 15 is secured a sprocket 106 over which a chain 107 passes, which chain is guided by idlers 108 and 109 having their shafts supported in the upper part A, namely on plate 21. The chain 107 also passes over a sprocket 110, on the shaft 58 (see Fig. 4). It will be noted that the chain 107, is re-entrant, so as not to interfere with the mouth C before described. The turning of the shaft 15 of part B turns the shaft 58 of part A, one revolution for the feeding, printing of the paper and inking of the type.

The one revolution of shaft 15 is divided into four parts. The first part is used for the feeding of the paper and its printing, also the feeding of the wire. The second part is used for the cutting of the paper and carrying it together with the staple die 14 to the staple mechanism 16, and also for the cutting and the bending of the wire into the form of a staple. The third part is used for pushing the staple through the garment and through the ticket, contacting with the die 14, bending the ends of the staple wire inwardly and completing the fastening. The fourth part is the returning of the operative parts back to their initial position.

This is a division of Serial No. 744,921 filed April 30, 1947, now Patent No. 2,590,088 patented March 25, 1952. Another divisional application was filed on October 25, 1948, under Serial Number 56,330, issued on January 1, 1952, under Patent Number 2,580,408.

I have described several forms of my invention, but obviously various changes may be made in the details disclosed without departing from the spirit of the invention as set out in the following claims.

I claim:

1. In a pinticket manufacturing and attaching machine, having a frame, the combination therewith, of a paper guide unit, including a frame, a printing roller supported by said paper guide unit frame over which the paper passes during the printing operation, a paper guide roller in advance of said printing roller supported by said frame disposed above the paper, prior to the printing operation, the upper surface of the printing roller being above the lower surface of the paper guide roller, a second guide roller at the other side of the printing roller supported by said frame disposed above the paper after the printing operation, the upper surface of printing roller being above the lower surface of the second guide roller, said guide rollers providing a curvature of the paper when passing over the printing roller, means securing said unit to the frame of the machine, means on the paper guide unit frame and the advanced paper guide roller for changing the curvature of the paper when passing over the printing roller, said means comprising a shaft for the advanced paper guide roller, said unit frame having slots therein for receiving the opposite ends of said shaft, and adjusting screws engaging said unit frame and said shaft for adjusting the shaft ends in said slots to move the advanced paper guide roller with respect to the printing roller.

2. In a pinticket manufacturing and attaching machine having a frame and a permanently located knife, the combination of a paper guide unit detachably secured to said frame, and a printing head shaft guide unit detachably secured to the machine frame adjacent said paper guide unit to dispose the printing head over the paper guide unit, said paper guide including a frame, a printing roller supported by said frame, and means providing a curvature to the paper when passing over the printing roller, and said printing head shaft guide unit including a first plate detachably secured to the machine frame, a second plate pivoted to said first plate, trunnions on said second plate for the printing head shaft, and means adjusting the plates to each other, said printing head shaft having a printing head over the printing roller, whereby the printing head and printing roller may be adjusted to each other, and means for adjusting said paper guide unit in relation to the knife, for variations in length of tickets and for variations in width of tickets, by substitution of other paper guide units.

3. In a pinticket manufacturing and attaching machine, having a frame, the combination therewith, of a printing head shaft guide unit, including a plate, trunnions on said plate, a printing head shaft supported by said trunnions, a second plate below said first plate, a pivotal connection between said first and second plates, for pivotally supporting said first plate, and means adjusting the first plate to the second plate, said means including a screw secured to said second plate to limit the movement of said first plate to said second plate, a spring on said first plate for giving a yieldability to the position of the printing shaft, of said trunnions, said spring being disposed between said first plate and a headed screw held by said second plate.

4. In a pinticket manufacturing and attaching machine having a frame and a permanently located knife supported by said frame, the combination of a paper guide unit secured to said frame, with one end adjacent said knife, and having a printing roller mounted therein, a printing head shaft guide unit having a printing head secured to said frame adjacent said paper guide unit to dispose the printing head over said printing roller adjacent said knife, said paper guide unit including a frame, and means varying the curvature of the paper when passing over said printing roller, said curvature varying means including a guide roller in advance and a guide roller at the other side of said printing roller, the upper surface of said printing roller being above the lower surface of each guide roller, said guide rollers providing a curvature of the paper when passing over said printing roller, and said printing head shaft guide unit including a first plate secured to said frame, a second plate pivoted to said first plate, trunnions on said second plate for the printing head shaft, and means adjusting the plates to each other, said adjusting means including a set screw limiting the movement of said second plate to the said first plate, and a headed screw, having a spring disposed between said head and said second plate for yieldingly supporting said printing head, whereby the printing head and printing roller may be adjusted to each other, and the said units adjusted in relation to the knife, for variations in length of tickets and for variations in width of tickets, by substitution of other paper guide units.

5. In a pinticket manufacturing and attaching machine, having a frame, and a knife on said frame, the combination therewith, of a paper guide unit, including a frame adjustably mounted on said machine frame, a printing roller supported by said frame over which the paper passes during the printing operation, paper guide rollers under which the paper passes on opposite sides of said printing roller and supported by the paper guide unit frame, and means for selectively adjusting the paper guide unit in the direction of the feed of the paper and in a direction opposite to that of the feed of the paper, towards and to said knife, said means comprising fastening elements for attaching said unit frame to said machine frame, and said unit frame having elongated slots for receiving said fastening elements.

ROBERT W. CLAUSS.

References Cited in the file of this patent

UNITED STATES PATENTS

| Number | Name | Date |
|---|---|---|
| 867,778 | Ames | Oct. 8, 1907 |
| 1,472,466 | Gammeter | Oct. 30, 1923 |
| 1,955,814 | Kranz | Apr. 24, 1934 |
| 2,203,706 | Stockbarger | June 11, 1940 |